United States Patent [19]

Pullen, V

[11] Patent Number: 5,016,995
[45] Date of Patent: May 21, 1991

[54] RADIATION GATHERING AND FOCUSSING APPARATUS AND DEVICES

[76] Inventor: William J. Pullen, V, P.O. Box 10202, Santiago, Chile

[21] Appl. No.: 313,490

[22] Filed: Feb. 22, 1989

[30] Foreign Application Priority Data

Apr. 28, 1988 [GB] United Kingdom ............... 8810127

[51] Int. Cl.⁵ ..................... G02B 23/00; G02B 5/08
[52] U.S. Cl. ................................ 350/537; 350/618; 350/622
[58] Field of Search ............... 126/425; 356/238, 429; 354/403; 350/500–506, 525, 320, 600–627, 169.2

[56] References Cited

U.S. PATENT DOCUMENTS

| | | | |
|---|---|---|---|
| 3,453,425 | 7/1969 | Whitaker | 350/620 |
| 3,790,258 | 2/1974 | Rambauske | 350/620 |
| 3,802,767 | 4/1974 | Rambauske | 350/294 |
| 3,982,824 | 9/1976 | Rambauske | 350/620 |
| 4,439,012 | 3/1984 | Christy | 350/620 |
| 4,595,833 | 6/1986 | Sting | 350/620 |
| 4,643,545 | 2/1987 | Vanderwall | 350/619 |
| 4,653,880 | 3/1987 | Sting et al. | 350/620 |
| 4,886,348 | 12/1989 | Schmertz | 350/613 |

FOREIGN PATENT DOCUMENTS 1412956 11/1975 United Kingdom .
1412957 11/1975 United Kingdom .

OTHER PUBLICATIONS

IBM Technical Disclosure Bulletin, pp. 1964–1966, vol. 16, No. 6, Nov. 1973.

Primary Examiner—Paul M. Dzierzynski
Assistant Examiner—Thong Nguyen
Attorney, Agent, or Firm—Wigman & Cohen

[57] ABSTRACT

A radiation focussing device has a reflecting surface which is at least part of a surface of revolution which is generated by a rotation of an arc of a parabola about a rotational axis. This axis is in the plane of the parabola, passes through the parabola focus and is at a non-zero angle, preferably 90° to the principal axis of the parabola. The arc lies on the opposite side of the rotational axis from the vertex of the parabola. When combined with a conical mirror this focussing device can focus parallel incoming rays.

8 Claims, 4 Drawing Sheets

RADIATION GATHERING AND FOCUSSING APPARATUS AND DEVICES

BACKGROUND OF THE INVENTION

The invention relates to radiation gathering apparatus and to a device for focussing radiation. The invention has wide application and is particularly described here in its application to optical astronomical telescopes and photography.

SUMMARY OF THE PRIOR ART

Prior art focussing devices are for example lenses and reflecting surfaces. In particular, the most common reflecting focussing device is the parabolic mirror which is, or is an approximation to, the surface of revolution of an arc of a parabola at the vertex of the parabola, about the axis of the parabola. Such reflecting systems are used in many optical, microwave and radio applications. Lens systems are more commonly used in, for example, land telescopes, binoculars and photographic cameras.

These prior art devices suffer from the disadvantage that the light gathering capacity, i.e. the effective aperture of the focussing system, depends on the objective component size, that is the size of the objective lens or mirror. This leads to the use of very large objective components for applications in which the incident radiation is weak. As a result the objective component becomes more difficult to make and the supporting structures become more complex so as to minimize imbalance and vibration of heavy components. In large lenses, light absorption in the lens becomes significant and is disadvantageous.

At present the largest single piece objective mirrors are about four meters in diameter (e.g. Palomar, Maunakea, Cerro Tololo etc.) and of six meters in diameter (USSR). Composite mirror techniques, such as the four computer-coordinated eight meters telescopes of the ESO-VLT/Cerro Pazanal Chile, giving an effective objective diameter of sixteen meters, are extremely costly and complex.

Amateur telescopes at present are limited by reason of cost, size and weight to lenses and mirrors of about 0.25 to 0.3 meters in diameter.

Similarly prior art radio and microwave transmitters and receivers use a portion of a parabola including the vertex as the reflective surface, and hence suffer from the same problem of the dependence of effective aperture on objective component size.

U.S. Pat. No. 3,802,767 and Great Britain Patent No. 1,412,957 of Raytheon Company disclose lens arrangements for combining rays of light from a number of sources into a single collimated beam. The documents show a reflective device which has a reflecting surface formed by rotating a part of a parabola about an axis parallel to and displaced from the principal axis thereof.

Similarly Great Britain Patent No. 1,412,956 of Raytheon Company discloses a reflective device which has a reflecting surface formed by rotating an arc of a parabola about an axis perpendicular to the principal axis of the parabola, and not passing through the focus of the parabola, or else at some other angle to the principal axis to give a line focus for incident radiation.

These devices would focus incident parallel rays into a focal ring rather than to a point, so that they are not useful for many applications to which the present invention is related.

European Patent Specification No. 194,820 discloses a radiation gathering apparatus including an annular angled reflecting surface which reflects rays onto a central cone. Rays which were incident on the annular surface parallel to the axis of the cone emerge from the apparatus once more parallel to the axis of the cone.

SUMMARY OF THE INVENTION

One object of the present invention is to provide an apparatus which easily and conveniently increases the effective aperture of a focussing system having a conventional objective lens or mirror and thus increases its light gathering capacity.

It is another object of the invention to provide a focussing objective reflecting surface which is particularly advantageous when used in a focussing system with such an adjustable effective aperture.

The invention, in a first aspect, generally provides a radiation focussing device which has a surface which is formed by rotating an arc of a parabola about a rotational axis different from the principal axis of the parabola, which rotational axis passes through the focus of the parabola.

In a second aspect, the invention generally provides a radiation gathering apparatus incorporating such a radiation focussing device.

DESCRIPTION OF THE DRAWINGS

The invention will now be illustrated and explained by embodiments which are described hereinbelow with reference to the accompanying drawings in which.

DESCRIPTION OF THE PREFERRED EMBODIMENTS

Figure 1:
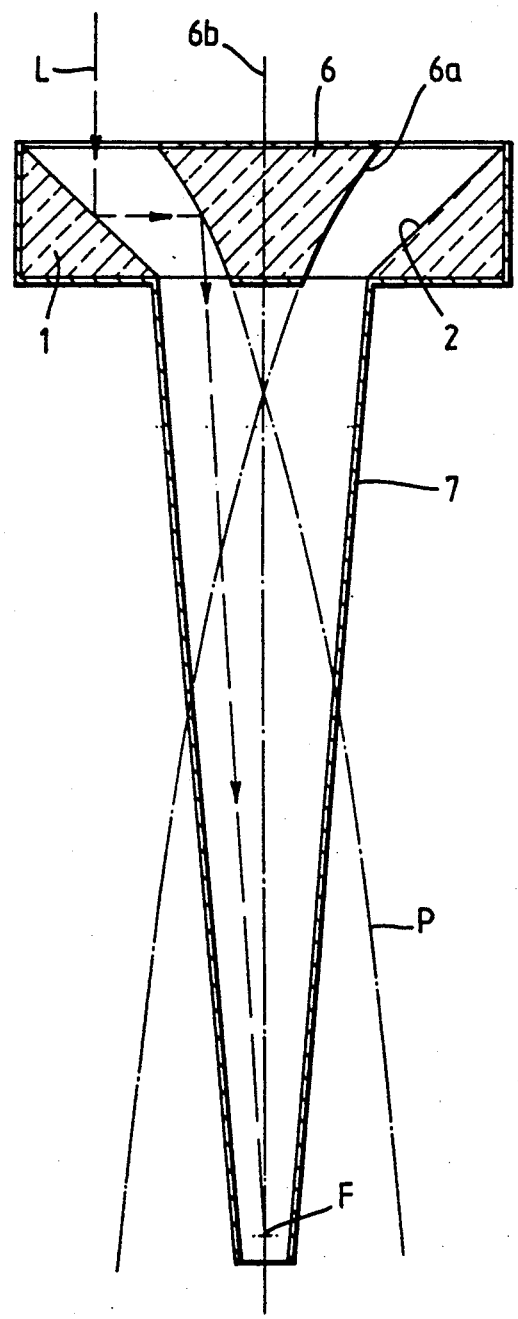
FIG. 1 is an axial section of a focussing system embodying the invention incorporating a focussing device and a reflecting annular body.
Figure 2:
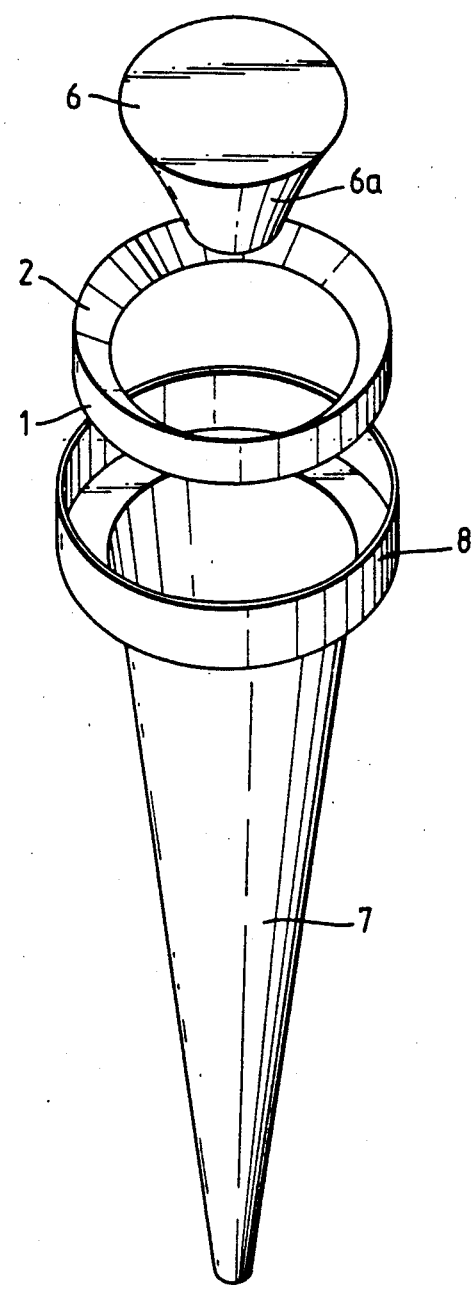
FIG. 2 is a perspective exploded view of the components of the focussing system of FIG. 1.

FIGS. 1 and 2 show a radiation gathering apparatus in the form of a focussing system according to the invention, using an annular ring 1 and a focussing body 6. The annular ring 1 has an inwardly facing reflecting surface 2 which is part of a surface of a cone with a half angle of 45°. The circularly symmetrical focussing body 6 has a peripheral reflecting surface 6a which focusses radiation travelling in radial directions with respect to its symmetry axis 6b, which is also the cone axis of the surface 2, to a focus F, is surrounded by the ring 1 and is coaxial with it. The shape and effect of this surface 6a, which is derived from a parabola P is explained below with reference to FIG. 3. The function of the reflecting ring 1 is to convert parallel rays L from the distant object viewed into radial rays which impinge on the reflecting surface 6a of the focussing device 6. Thus the ring 1 and surface 6a act as an objective. This means that the conventional objective component, for example the objective mirror of a conventional optical telescope is not required. The ocular lens of the telescope is not shown.

The effective aperture of the focussing system of FIGS. 1 and 2 can be increased simply by the exchange of the reflecting surface 2 for one with a larger radius, and in the absence of a bulky objective lens or mirror, the volume of the optical tube 7 of the apparatus can be kept small.

The focussing surface 6a can be made as small as is consistent with the resolution of the optical instrument while the light-gathering capacity of the instrument can be maintained. This has particular advantages in amateur optical astronomical telescopes in which compactness and high light-gathering capacity are very important. A typical arrangement is shown in FIGS. 1 and 2, where the reflecting surface 2 is mounted in a holder 8, which is itself mounted on an optical tube 7. The focussing body 6 is mounted coaxially with the reflecting surface 2 and surrounded by it.

Figure 3:
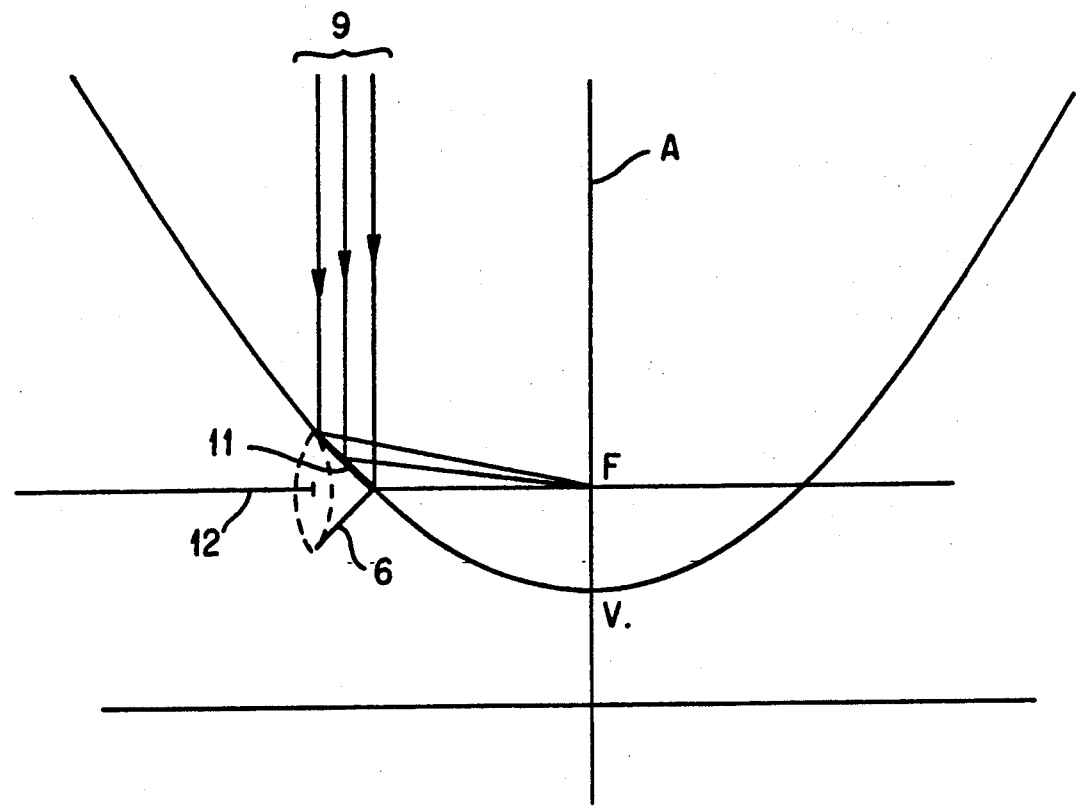
FIG. 3 is a diagram illustrating the parabolic arc to be rotated about an axis to generate a focussing device according to the invention.

The shape of the focussing surface 6a will now be described with reference to FIG. 3, which shows a parabola. Any ray parallel to the axis A of the parabola is reflected to the focus F. Hence rays 9 striking regions of the parabola further from the vertex V than the line 12 (known as the Latus Rectum) which passes through the focus F perpendicularly to the parabola axis A are also reflected to the focus F. If a surface is generated by rotating an arc 11, which is more remote from the vertex V than the line 12, about the axis formed by the line 12 then any ray striking this surface radially (with respect to the axis 12) will be reflected to the focus F. The surface 6a of FIGS. 1 and 2 is such a surface.

This property means that the surface 6a is particularly suitable for use in conjunction with the ring-shaped reflecting surface 2 described above. Other surfaces having suitable focussing properties can be generated by rotating an arc of a parabola P and using as an axis of rotation any line which is (a) in the plane of the parabola P, (b) passes through the focus and (c) is at a non zero angle $\theta$ to the axis of the parabola P. The arc of the parabola P which rotates must be on the opposite side of the axis of rotation from the vertex of the parabola. In this general case, only rays incident at an angle of $\theta$ to the axis of the focussing device having this surface are focussed at F. Hence the focussing device 6 may then be used with the ring-shaped reflecting surface 2, having a cone half angle of the cone of $90-\theta/2$. This is the general case of which FIGS. 1 and 2 are a particular example. In FIGS. 1 and 2 $\theta$ is 90° and the cone half angle of the surface 2 is 45°. Values of $\theta \geq 45°$ are preferred.

In the general case the axial position of the focussing device 6 relative to the reflecting surface 2 is such that rays reflected from the reflecting surface 2 are incident on the surface 6a of the focussing device 6.

Figure 4:
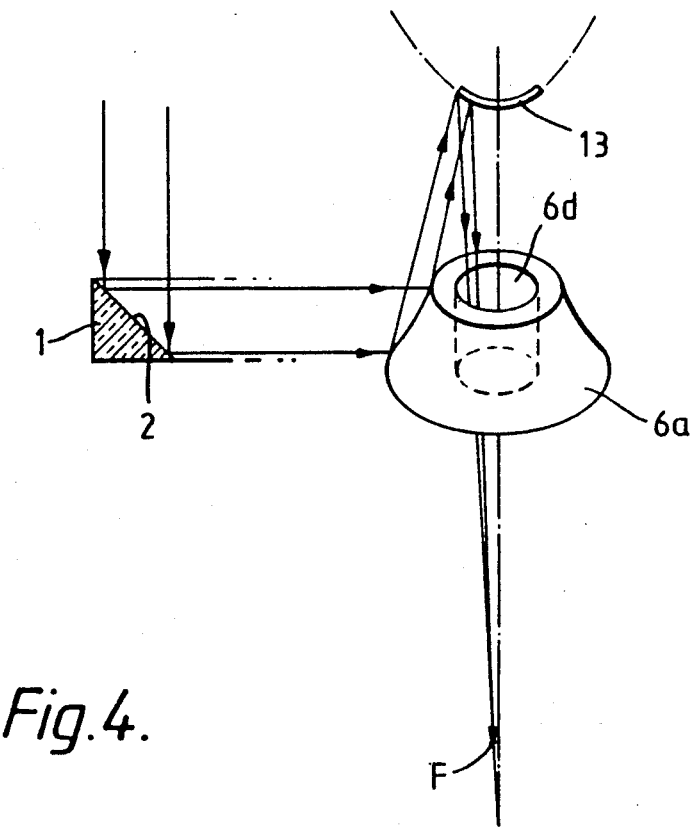
FIG. 4 is a diagrammatic representation of a focussing system embodying the invention with a "folded" configuration.
Figure 5:
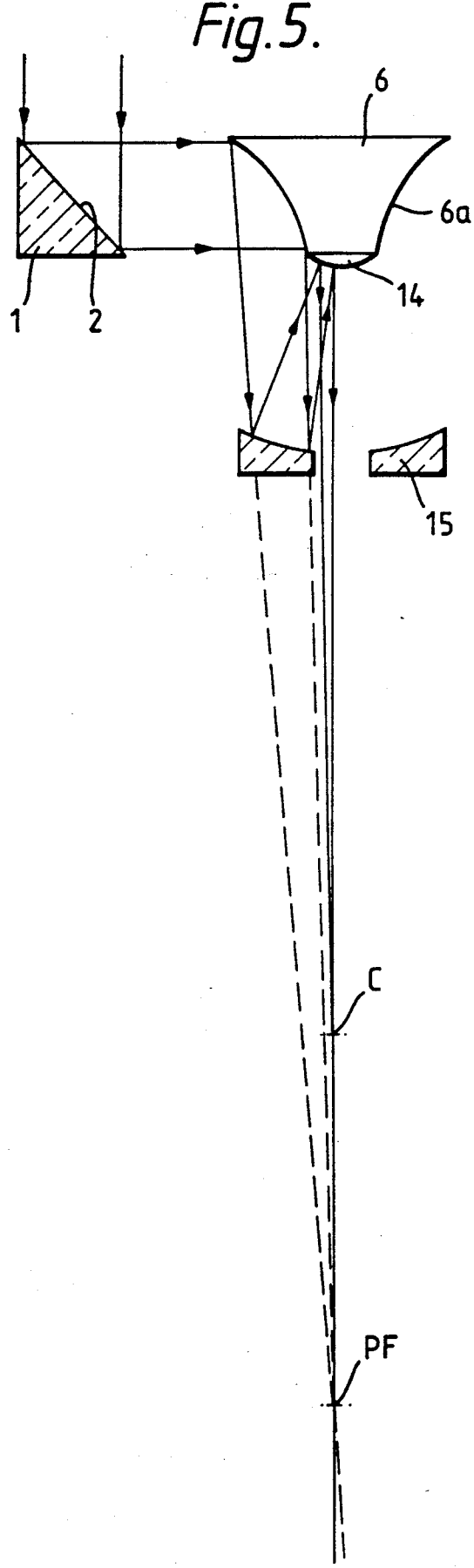
FIG. 5 is a diagrammatic representation of a focussing system embodying the invention with a Cassegrain-type configuration.

The body 6 carrying the focussing surface 6a may have a hole 6d to achieve a folding configuration for optical telescopes in conjunction with a convex secondary mirror 13 as shown in FIG. 4. Or the body 6 may carry a hyperbolic surface portion 14 at the narrow end of the surface 6a to give, in conjunction with a paraboloid mirror 15, a Cassegrain-type configuration as shown in FIG. 5. In FIG. 5, C is the combination focus and PF the prime focus.

It is calculated that a prior art astronomical telescope with a 0.25 m aperture and a central obstruction of 85 mm, having a parabolic primary mirror with a useful area of 454 cm$^2$ and an optical tube volume of 35 liters may be replaced by a telescope using a reflecting surface 2 and a focussing surface 6a according to the invention with effective aperture of 0.3 m which would have an optical tube volume of less than 10 liters.

Figure 6A:
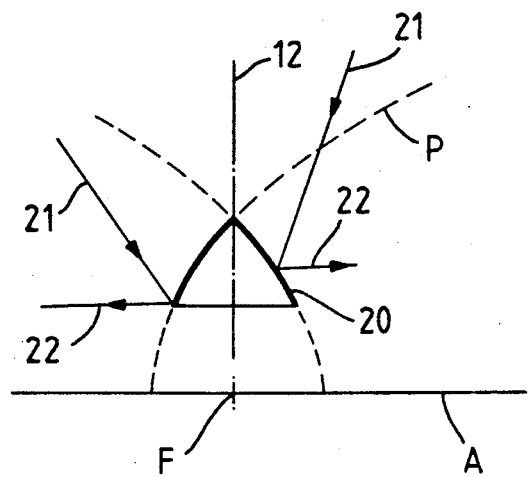
FIGS. 6A and 6B are diagrams illustrating another reflecting device of the invention and radiation-gathering arrangements.
Figure 6B:
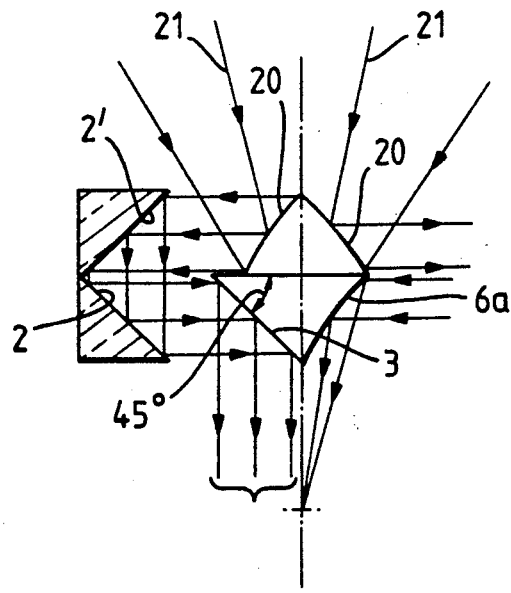

A second reflecting device according to the invention is a body having a reflecting surface which is at least part of the surface of revolution generated by the rotation of an arc of a parabola P about an axis which is in the plane of the parabola P, passes through the focus of the parabola P, and is at an angle of $\theta$ to the axis of the parabola P, $\theta$ being non-zero, said arc of the parabola P lying on the same side of said rotational axis as the vertex of the parabola, and the reflecting surface being convex (i.e. at the side of the parabola arc remote from said rotational axis). $\theta$ is preferably at least 45°, e.g. is 90°. This reflecting device is illustrated by FIGS. 6A and 6B. The surface 20 is obtained by rotating an arc, indicated by a heavy line in FIG. 6A, about the latus rectum (in the case $\theta = 90°$) and the reflecting surface is formed at the outside of the body formed by this rotation. The effect of the surface 20 so formed is that any ray, such as ray 21, directed at the focus of the parabola is reflected as a ray 22 parallel to the axis A of the parabola P.

How this surface 20 may be used is illustrated in FIG. 6B. Rays reflected parallel to the axis of the parabola are reflected by two annular reflecting rings 2',2 each corresponding in shape to the ring 1 of FIG. 1, the surface 2' being inverted with respect to the surface 2, in order to provide inwardly radially directed radial rays. These inwardly directed radial rays are then reflected by a conical surface 3 shown at the left hand side of FIG. 6B to produce rays parallel to the axis of the device. Alternatively they are focussed by a surface 6a corresponding to the parabola derived surface 6a of FIGS. 1 and 2 (as shown at the right hand side of FIG. 6B) to produce focussed rays as hereinbefore described. The reflecting surfaces 2,2' are not shown at the right hand side of FIG. 6B but are present and function as on the left hand side.

Figure 7:
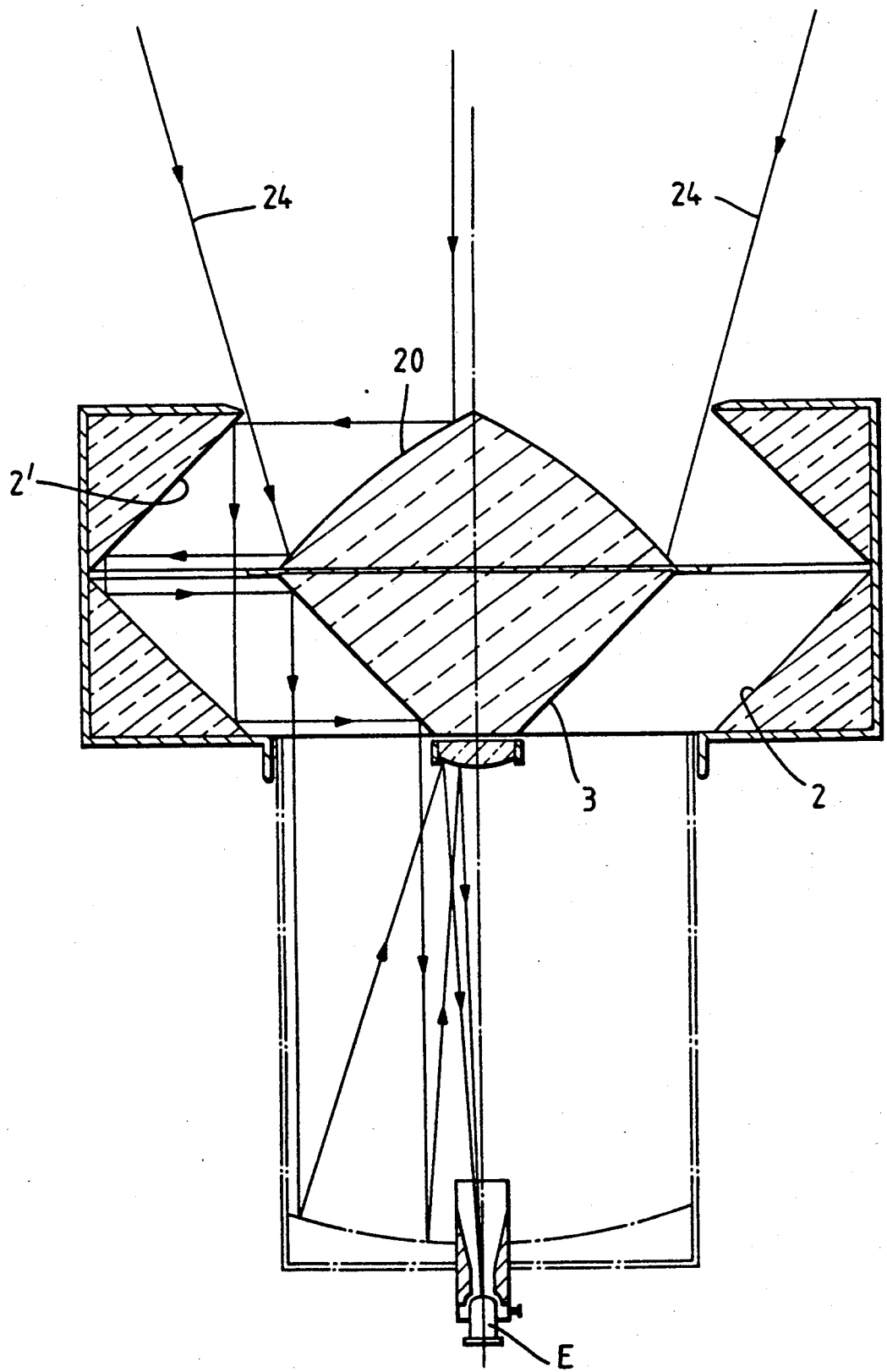
FIG. 7 shows a Cassegrain telescope including a light-gathering arrangement of FIG. 6B.

FIG. 7 shows the arrangement outlined at the left hand side of FIG. 6B applied to a Cassegrain astronomical telescope, to provide a wide angle light gathering capacity for this telescope.

The apparatus of FIG. 7 comprises the second reflecting surface 20 as described above and illustrated in FIGS. 6A and 6B which collects light over a wide angle. The light then travels radially to the two annular reflecting rings 2,2' as described above. A reflecting cone surface 3 as illustrated in FIG. 6B left hand side reflects the parallel rays which travel parallel to the axis of the telescope. Next, a conventional Cassegrain-type structure of a secondary parabolic mirror and a hyperboloid mounted at the narrow end of the cone surface 3 is used to focus the rays at an eyepiece E.

A "wide angle" light gathering arrangement as shown in FIGS. 6 and 7 is useful in astronomy when searching or monitoring a wide area of the sky e.g. when searching for a nova which reveals itself as a "flare". The purpose of the arrangement may then be used to photograph a large sky area. The device of FIG. 6B, left side, may be attached to a conventional optical telescope or camera. The device of FIG. 6B, right hand side, incorporates its own focussing surface 6a.

It is clear that there are many advantages that the invention gives in optical, particularly astronomical telescope, applications. However advantages from use of the invention are also to be gained at all frequencies of the electromagnetic spectrum where an increase in effective aperture or a more convenient form of focussing system is required.

What is claimed is:

1. An astronomical optical telescope for receiving radiant energy from sources external thereto having:
    a symmetry axis,
    an eyepiece located at said symmetry axis,
    a first reflecting surface extending circumferentially around said symmetry axis, facing towards said symmetry axis and being part of a surface of a cone coaxial with said symmetry axis, said first reflecting surface being oriented to receive radiant energy from sources external to said telescope, and
    a second reflecting surface which is a focussing surface and is at least part of a surface of revolution generated by rotation of a parabolic arc about said symmetry axis, said parabolic arc belonging to a parabola having a principal axis which is at a non-zero angle $\theta$ degrees to said symmetry axis, a focus which lies on said symmetry axis and a vertex which lies on the opposite side of said symmetry axis from said parabolic arc,
    wherein (i) the half angle of said cone is $90-\theta/2$ degrees and (ii) the axial position of said second reflecting surface is positioned relative to said first reflecting surface such that rays of radiation which are parallel to said symmetry axis and incident upon said first reflecting surface are reflected from said second reflecting surface convergently, said eyepiece being located so as to receive said rays of radiation reflected from said second reflecting surface.

2. The telescope of claim 1 wherein said angle $\theta$ is not less than 45°.

3. The telescope of claim 1 wherein said angle $\theta$ is 90°.

4. The telescope of claim 1 wherein said second reflecting surface is a surface of a body which has a through hole through its center, and said telescope further comprising a convex mirror positioned relative to said second reflecting surface such that rays reflected from said second reflecting surface are further reflected from said mirror to pass through said through hole.

5. The telescope of claim 1 further comprising a third reflecting surface which is a hyperboloid surface, and a paraboloid mirror positioned relative to said second reflecting surface such that rays reflected from said second reflecting surface are further reflected by said paraboloid mirror onto said hyperboloid surface and from said hyperboloid surface converge to a focus.

6. A radiation gathering device for receiving radiant energy from external sources randomly arrayed with respect thereto having:
    at least one convex reflecting surface, said convex reflecting surface being at least part of a surface of revolution which is generated by a rotation of an arc of a parabola,
    said parabola having a focus and a vertex, and a principal axis and lying in a plane, and
    said rotation being about a rotational axis, which rotational axis is in said plane, passes through said focus and is at an angle $\theta$ to said principal axis,
    wherein said angle $\theta$ is non-zero and said arc of said parabola lies on the same side of said rotational axis as said vertex of said parabola and
    wherein further said convex reflecting surface is oriented to receive radiant energy from randomly arrayed sources of radiant energy external to said device.

7. A radiation gathering apparatus having:
    a symmetry axis,
    a first reflecting surface extending circumferentially about said symmetry axis and facing towards said symmetry axis and being part of a surface of a first cone coaxial with said symmetry axis, and
    a second reflecting surface which is at least part of a convex surface of revolution generated by rotation of a parabolic arc about said symmetry axis, said parabolic arc belonging to a first parabola having a principal axis which is at a non-zero angle $\theta$ degrees to said symmetry axis, a focus which lies on said symmetry axis and a vertex wherein said vertex and said parabolic arc lie on the same side of said symmetry axis,
    wherein (i) the half angle of said first cone is $90-\theta/2$ degrees and (ii) said second reflecting surface is positioned relative to said first reflecting surface such that rays of radiation incident upon said second reflecting surface and converging to said focus are reflected therefrom onto said first reflecting surface and are reflected from said first reflecting surface parallel to said symmetry axis, and
    a third reflecting surface extending circumferentially about said symmetry axis and facing towards said symmetry axis and being part of the surface of a second cone coaxial with the said symmetry axis, said third reflecting surface being opposed to said first reflecting surface so that said rays of radiation reflected by said first reflecting surface parallel to said symmetry axis are reflected towards said symmetry axis by the said third reflecting surface, and
    the apparatus further having a fourth reflecting surface which is a focussing surface and is at least part of a surface of revolution which is concave in section, each section of said surface of revolution lying in a plane including said symmetry axis and is generated by a rotation of an arc of a second parabola, said parabola having a focus, a vertex and a principal axis lying in a plane and said rotation of said arc of said second parabola being about a rotational axis which is in said plane of said second parabola, passes through said focus of said second parabola and is at angle $\theta'$ degrees to said principal axis of said second parabola,
    wherein said angle $\theta'$ is non-zero and said arc of said second parabola lies on the opposite side of said rotational axis from said vertex of said second parabola, said second cone having a half angle of $90-\theta'/2$ degrees and said fourth reflecting surface positioned with respect to said third reflecting surface so as to receive said rays of radiation reflected towards said symmetry axis by said third reflecting surface and to reflect them convergently.

8. A radiation gathering apparatus having:
    a symmetry axis, a first reflecting surface extending circumferentially around said symmetry axis and facing towards said symmetry axis and being part of a surface of a first cone coaxial with said symmetry axis, and a second reflecting surface which is at least part of a convex surface of revolution generated by rotation of a parabolic arc about said symmetry axis, said parabolic arc belonging to a first parabola having a principal axis which is at a non-zero angle $\theta$ degrees to said symmetry axis, a focus which lies on said symmetry axis and a vertex wherein said vertex and said parabolic arc lie on the same side of said symmetry axis, wherein (i) the half angle of said first cone is $90-\theta/2$ degrees and (ii) said second reflecting surface is positioned relative to said first reflecting surface such that rays of radiation incident upon said second reflecting surface and converging to said focus are reflected therefrom onto said first reflecting surface and are reflected from said first reflecting surface parallel to said symmetry axis, and a third reflecting surface extending circumferentially about said symmetry axis and facing towards said symmetry axis and being part of a surface of a second cone coaxial with the said symmetry axis, said third reflecting surface being opposed to said first reflecting surface so that said rays of radiation reflected by said first reflecting surface parallel to said symmetry axis are reflected towards said symmetry axis by said third reflecting surface, and the apparatus further having a fourth reflecting surface which is a part of a surface of a third cone coaxial with said symmetry axis and having the same cone angle as said second cone, said fourth reflecting surface facing outwardly from said symmetry axis and being opposed to said third reflecting surface so that said rays of radiation reflected towards said symmetry axis by said third reflecting surface are reflected by said fourth reflecting surface parallel to said symmetric axis.

* * * * *